US012657321B2

(12) United States Patent
Schaffer et al.

(10) Patent No.: US 12,657,321 B2
(45) Date of Patent: Jun. 16, 2026

(54) VERIFYING DIGITAL FILES AGAINST RULES

(71) Applicant: Capital One Services, LLC, McLean, VA (US)

(72) Inventors: Anne Tyler Schaffer, Glen Allen, VA (US); Robert Mays, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 302 days.

(21) Appl. No.: 18/488,300

(22) Filed: Oct. 17, 2023

(65) Prior Publication Data

US 2025/0124153 A1     Apr. 17, 2025

(51) Int. Cl.
*G06F 21/62* (2013.01)
*G06F 9/451* (2018.01)

(52) U.S. Cl.
CPC .......... *G06F 21/6218* (2013.01); *G06F 9/451* (2018.02)

(58) Field of Classification Search
CPC ............................ G06F 21/6218; G06F 9/451
See application file for complete search history.

(56) References Cited

U.S. PATENT DOCUMENTS

| | | | | | |
|---|---|---|---|---|---|
| 2011/0093258 A1* | 4/2011 | Xu | ........................ | G06F 40/237 704/9 |
| 2014/0149105 A1* | 5/2014 | Lamba | .................. | G06F 40/279 704/9 |

| | | | | | |
|---|---|---|---|---|---|
| 2016/0055132 A1* | 2/2016 | Garrison | ............... | G06F 16/958 706/12 |
| 2016/0078245 A1* | 3/2016 | Amarendran | .......... | G06N 20/00 713/193 |
| 2017/0220535 A1* | 8/2017 | Olsen | ..................... | G06F 40/166 |
| 2018/0013789 A1* | 1/2018 | Damian | .............. | H04L 63/1483 |
| 2018/0061256 A1* | 3/2018 | Elchik | ...................... | G09B 5/02 |
| 2018/0239826 A1* | 8/2018 | Epstein | ................ | G06Q 50/184 |
| 2018/0293354 A1* | 10/2018 | Dejori | ..................... | G16H 50/20 |
| 2018/0357105 A1* | 12/2018 | Rishabh | .................. | H04L 63/10 |
| 2019/0019055 A1* | 1/2019 | Zhou | ..................... | G06V 30/148 |
| 2019/0294726 A1* | 9/2019 | Santoso | ................ | G06F 16/313 |
| 2021/0089285 A1* | 3/2021 | Du | ........................... | G06F 8/447 |
| 2021/0150263 A1* | 5/2021 | Corwin | ................ | G06F 40/186 |
| 2021/0216259 A1* | 7/2021 | Ullmann | .............. | G06F 3/1238 |
| 2022/0174092 A1* | 6/2022 | Farjon | ................... | G06F 40/221 |
| 2022/0222431 A1* | 7/2022 | Zionpour | ................ | G06F 40/30 |
| 2024/0037811 A1* | 2/2024 | Azaz | ...................... | G06V 10/70 |

OTHER PUBLICATIONS

Co-pending U.S. Application No. 17/932,114, filed Sep. 14, 2022, entitled "Detecting Reliability Across the Internet After Scraping".

* cited by examiner

*Primary Examiner* — Javier O Guzman

(74) *Attorney, Agent, or Firm* — Harrity & Harrity, LLP

(57) ABSTRACT

In some implementations, a rules system may receive a digital file associated with an entity. The rules system may receive, from a user device, an indication of a set of rules associated with the entity. The rules system may apply a model, associated with the set of rules, to determine whether the digital file is compliant with the set of rules and may determine at least one compliance result based on output from the model. The rules system may transmit, to the user device, instructions for a user interface that indicates the at least one compliance result.

20 Claims, 9 Drawing Sheets

500 ➤

510 — Receive, at a rules engine, a digital file associated with an entity

520 — Receive, from a user device, an indication of a set of rules associated with the entity 530 — Apply a model, associated with the set of rules, to determine whether the digital file is compliant with the set of rules 540 — Determine at least one compliance result based on output from the model 550 — Transmit, to the user device, instructions for a UI that indicates the at least one compliance result

100

105b
Digital file

Repository

Rules System

105a
Digital file

User Device

100

115
Select model

Rules System

110
Indication of set of rules

User Device

100

130
Apply predictive model
to the digital file

Rules System

135
Audience indication

User Device

400

Bus
410

Processor
420

Memory
430

Input
Component
440

Output
Component
450

Communication
Component
460

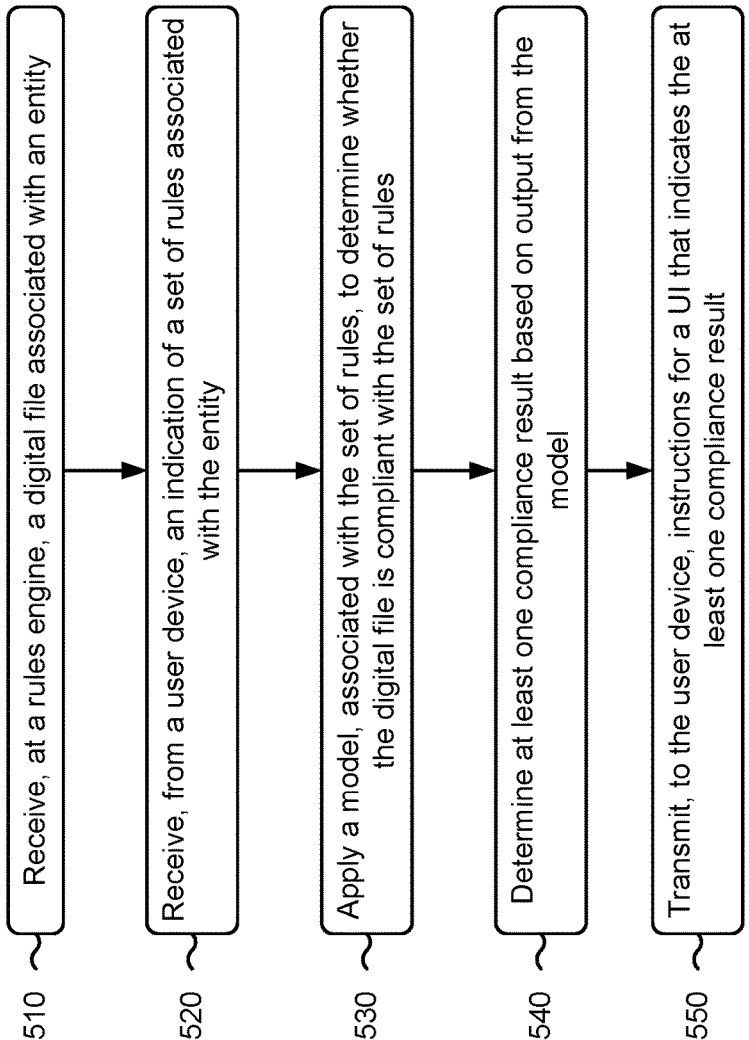

510  Receive, at a rules engine, a digital file associated with an entity

520  Receive, from a user device, an indication of a set of rules associated with the entity 530  Apply a model, associated with the set of rules, to determine whether the digital file is compliant with the set of rules 540  Determine at least one compliance result based on output from the model 550  Transmit, to the user device, instructions for a UI that indicates the at least one compliance result

VERIFYING DIGITAL FILES AGAINST RULES

BACKGROUND

Digital assets associated with an entity (e.g., an organization, such as a corporation, or a group, such as an advocacy group) may include files representing media for digital distribution (e.g., email messages or webpages, among other examples) and/or files representing media for physical distribution (e.g., mailers or posters, among other examples).

SUMMARY

Some implementations described herein relate to a system for verifying digital files. The system may include one or more memories and one or more processors communicatively coupled to the one or more memories. The one or more processors may be configured to receive a digital file associated with an entity. The one or more processors may be configured to receive, from a user device, an indication of a set of rules, associated with the entity, out of a plurality of possible sets of rules. The one or more processors may be configured to select a machine learning model associated with the set of rules. The one or more processors may be configured to apply the machine learning model to determine whether the digital file is compliant with the set of rules. The one or more processors may be configured to determine that the digital file satisfies an inclusion threshold based on output from the machine learning model. The one or more processors may be configured to instruct a digital asset management (DAM) system to store the digital file based on the inclusion threshold being satisfied.

Some implementations described herein relate to a method of verifying digital files. The method may include receiving, at a rules system, a digital file associated with an entity. The method may include receiving, from a user device, an indication of a set of rules associated with the entity. The method may include applying a model, by the rules system and associated with the set of rules, to determine whether the digital file is compliant with the set of rules. The method may include determining, by the rules system, at least one compliance result based on output from the model. The method may include transmitting, to the user device, instructions for a user interface that indicates the at least one compliance result.

Some implementations described herein relate to a non-transitory computer-readable medium that stores a set of instructions for verifying digital files. The set of instructions, when executed by one or more processors of a device, may cause the device to receive a digital file associated with an entity. The set of instructions, when executed by one or more processors of the device, may cause the device to apply a machine learning model to determine whether the digital file is compliant with a set of rules associated with the entity. The set of instructions, when executed by one or more processors of the device, may cause the device to determine that the digital file satisfies an inclusion threshold based on output from the machine learning model. The set of instructions, when executed by one or more processors of the device, may cause the device to instruct a DAM system to store the digital file based on the inclusion threshold being satisfied.

BRIEF DESCRIPTION OF THE DRAWINGS

FIG. 5 is a flowchart of an example process relating to verifying digital files against rules, in accordance with some embodiments of the present disclosure.

DETAILED DESCRIPTION

The following detailed description of example implementations refers to the accompanying drawings. The same reference numbers in different drawings may identify the same or similar elements.

An entity (e.g., an organization, such as a corporation, or a group, such as an advocacy group) may produce digital files for distribution. For example, the digital files may represent media for digital distribution (e.g., email messages or webpages, among other examples) and/or media for physical distribution (e.g., mailers or posters, among other examples). Different users throughout the entity may contribute to the digital files.

Generally, the entity may establish rules (e.g., based on a style guide) that govern production of media. However, verifying a digital file against the rules usually involves multiple communications between users in the entity. These communications consume power, processing resources, and network overhead. Additionally, these communications are often text-based, such that the users are less likely to read the text and correct the digital file. As a result, digital files that are non-compliant with the rules may be stored in a digital asset management (DAM) system, and thus users may consume additional power, processing resources, and network overhead in the future by re-validating digital files stored in the DAM system against the rules.

Some implementations described herein enable a model to automatically verify digital files against rules. As a result, power, processing resources, and network overhead are conserved that would otherwise have been consumed in verifying the digital files by using multiple communications between users. In some implementations, output from the model may be shown in an intuitive user interface (UI). As a result, users are more likely to view the UI and correct the digital files. Additionally, or alternatively, tickets may be automatically generated based on output from the model, which similarly increases chances that users will view the tickets and correct the digital files. Additionally, or alternatively, a DAM system may integrate with the model. As a result, the DAM system may automatically reject digital files that are non-compliant with the rules, and thus additional power, processing resources, and network overhead are conserved because users can refrain from re-validating digital files stored in the DAM system against the rules.

FIGS. 1A-1D are diagrams of an example 100 associated with verifying digital files against rules. As shown in FIGS. 1A-1D, example 100 includes a user device, a rules system, a repository, a ticket management system, and a DAM system. These devices are described in more detail in connection with FIGS. 3 and 4.

Figure 1A:
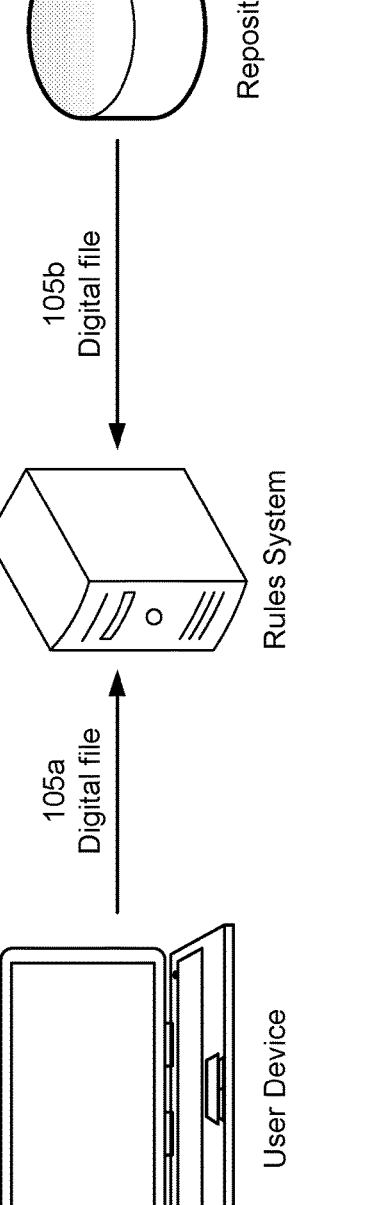
FIGS. 1A-1D are diagrams of an example implementation relating to verifying digital files against rules, in accordance with some embodiments of the present disclosure.

As shown in FIG. 1A and by reference number 105a, the user device may transmit, and the rules system may receive, a digital file associated with an entity. The digital file may represent media for digital distribution (e.g., an email message or a webpage, among other examples) and/or media for physical distribution (e.g., a mailer or a poster, among other examples). The user device may use a file transfer protocol (FTP) or another similar type of protocol to upload the digital file to the rules system. In some implementations, a user of the user device may provide input (e.g., via an input component of the user device) that triggers the user device to transmit the digital file. The input may include interaction with a UI (e.g., output via an output component of the user device) that triggers the user device to transmit the digital file. For example, the input may include interaction with an input element (e.g., a text box) to indicate a location of the digital file (whether local to the user device or at least partially remote from the user device) and/or interaction with an action element (e.g., a button) to trigger the user device to upload the digital file.

In some implementations, the rules system may authenticate the user device before accepting the digital file. For example, the user device may transmit, and the rules system may receive, a set of credentials (e.g., a username and password, a passcode, a certificate, a private key, and/or an access token, among other examples). The rules system may thus validate the set of credentials before receiving the digital file. In some implementations, a single sign on (SSO) service associated with the user device may perform the authentication. Accordingly, the SSO service may transmit, and the rules system may receive, an authorization, and the rules system may receive the digital file based on the authorization from the SSO service.

Additionally, or alternatively, as shown by reference number 105b, the repository may transmit, and the rules system may receive, the digital file associated with the entity. The repository may store digital assets associated with the entity. In some implementations, the rules system may transmit, and the repository may receive, a request for the digital file. Therefore, the repository may transmit, and the rules system may receive, the digital file in response to the request. The repository may be local to the rules system (e.g., a cache or another type of memory controlled by the rules system), such that the request includes a memory read command. Alternatively, the repository may be at least partially separate (e.g., logically, virtually, and/or physically) from the rules system, such that the request includes a hypertext transfer protocol (HTTP) request, an FTP request, and/or an application programming interface (API) call, among other examples.

In a combinatory example, the user device may transmit, and the rules system may receive, an indication of a location associated with the digital file. The location may include a filename, a file path, an alphanumeric identifier associated with the digital file, and/or another type of identifier that indicates where the digital file is stored. Accordingly, the rules system may transmit, and the repository may receive, a request for the digital file based on the location (which indicates that the digital file is stored in the repository). Therefore, the repository may transmit, and the rules system may receive, the digital file in response to the request.

Figure 1B:
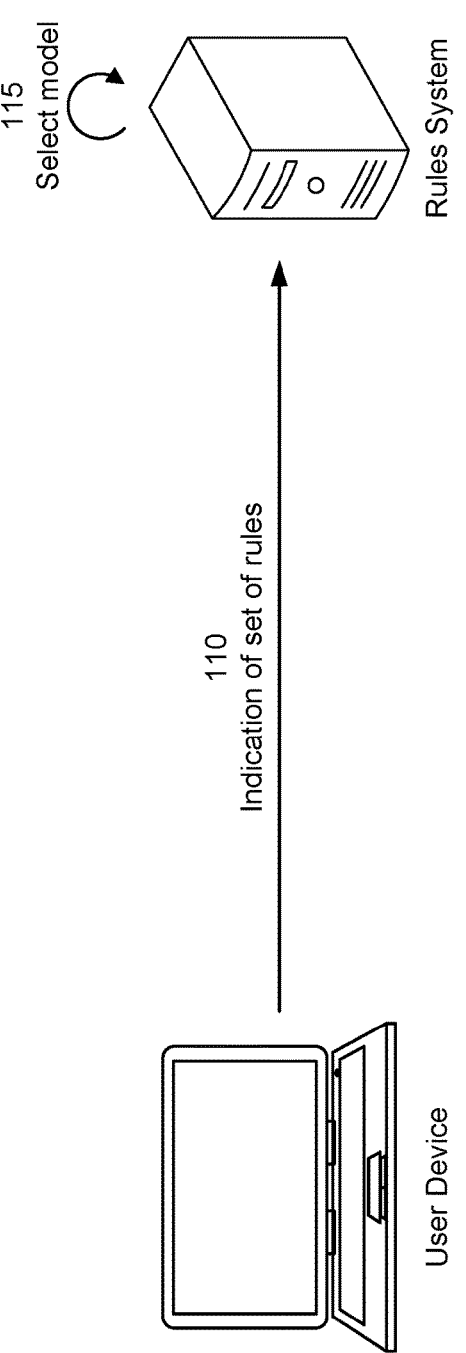

As shown in FIG. 1B and by reference number 110, the user device may transmit, and the rules system may receive, an indication of a set of rules associated with the entity. The rules may include a tone rule (e.g., a rule associated with using a particular tone score or category as determined by a tone model), a grammar rule (e.g., a rule associated with using a particular spelling variation and/or whether or not to use Oxford commas, among other examples), a color rule (e.g., a rule associated with particular colors to use and/or particular proportions of different colors to use, among other examples), a logo rule (e.g., a rule associated with a particular type of logo and/or a particular size of logo to use, among other examples), and/or a font rule (e.g., a rule associated with using a particular font and/or a particular font size, among other examples). Other rules may include photograph rules (e.g., a rule associated with color palettes, tones, exposures, brightness, and/or filters to use) and/or spacing rules (e.g., a rule associated with how much spacing should be between headers, text, and/or images), among other examples.

In some implementations, the set of rules may have been selected out of a plurality of possible sets of rules. For example, the user device may indicate that some rules (e.g., photograph rules) are irrelevant to the digital file (e.g., because the digital file does not include a photograph). Additionally, or alternatively, the user device may indicate that some rules (e.g., tone rules) are relevant to the digital file (e.g., because the digital file is an email message and thus includes significant text). In one example, the rules system may transmit, and the user device may receive, instructions for UI elements. The UI elements may include radio buttons, checkboxes, a drop-down menu, and/or another type of selectable element. Accordingly, the user of the user device may interact with the UI elements (e.g., via an input component of the user device), and the user device may transmit the indication of the set of rules based on the interaction with the UI elements. For example, the user may check a checkbox, associated with a tone rule, in order to indicate that the rules system should apply the tone rule to the digital file, and the user may leave a checkbox, associated with a color rule, unchecked in order to indicate that the rules system should refrain from applying the color rule to the digital file.

Additionally, or alternatively, as shown by reference number 115, the rules system may select a model, associated with the set of rules, to apply to the digital file. For example, the rules system may select a regular expression (e.g., at least one regular expression, also referred to as a "regex") and/or a machine learning model (e.g., at least one machine learning model). The machine learning model may output an indication of whether the digital file is compliant with the set of rules (or at least a portion of the set of rules). In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., historical digital files associated with the entity). For example, for a regression algorithm, a model parameter may include a regression coefficient (e.g., a weight). For a decision tree algorithm, a model parameter may include a decision tree split location, as an example.

Additionally, the rules system may use one or more hyperparameter sets to tune the model. A hyperparameter may include a structural parameter that controls execution of a machine learning algorithm, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar features of digital assets together. Accordingly, the rules system may generate the indication based on clusters that include features from the digital file (e.g., based on whether the clusters are associated with compliance or non-compliance).

The rules system may select the model based on the set of rules as indicated by the user device (e.g., as described above). For example, the rules system may apply a model associated with a tone rule and may refrain from applying a model associated with a color rule, based on the user device indicating the tone rule but not the color rule. Alternatively, the rules system may select the model by default (e.g., based on a stored setting). In some implementations, the rules system may apply a model by default unless the user device indicates otherwise (e.g., a model associated with a tone rule is always applied unless the user device indicates not to apply the model). However, the rules system may apply some models regardless of what the user device indicates (e.g., a model associated with a color rule may be applied no matter what the user device indicates).

Additionally, or alternatively, the rules system may select the model based on a format associated with the digital file. For example, the rules system may apply a neural network model based on the digital file being in an image format (e.g., a joint photographic experts group (JPEG) format, a portable network graphics (PNG) format, or another type of image format) and may apply a regular express model based on the digital file being in a portable document format (PDF). In another example, the rules system may apply a random forest model based on the digital file being in a word processor format (e.g., a Microsoft® Word format, an OpenOffice® format, or a format associated with another type of word processor) and may apply a regression algorithm based on the digital file being in a webpage format (e.g., a hypertext markup language (HTML) format, a cascading style sheets (CSS) format, or another type of format used on the Internet or an intranet). The rules system may thus apply different models (and/or different sets of rules) for different file formats.

Additionally, or alternatively, the rules system may select the model based on an audience associated with the digital file. For example, the user device may transmit, and the rules system may receive, an indication of an audience associated with the digital file, and the rules system may select the machine learning model based on the indication of the audience. In one example, the rules system may transmit, and the user device may receive, instructions for UI elements. The UI elements may include radio buttons, checkboxes, a drop-down menu, and/or another type of selectable element. Accordingly, the user of the user device may interact with the UI elements (e.g., via an input component of the user device), and the user device may transmit the indication of the audience based on the interaction with the UI elements. For example, the user may select a radio button, associated with young professionals, in order to trigger the user device to transmit an indication that the audience is younger white collar workers. In another example, the user may select a radio button, associated with retired folks, in order to trigger the user device to transmit an indication that the audience is older retirees. The rules system may thus apply different models (and/or different sets of rules) for different audiences.

Although the example 100 is described in connection with the rules system selecting a model to apply, other examples may include a unified model that the rules system applies to all digital files. In one example, the unified model may include a bundle of models with an initial model that selects a model, out of remaining models in the bundle, to apply to the digital file. The initial model may perform the selection based on the set of rules indicated by the user device, a format of the digital file, and/or an audience indicated by the user device. In another example, a single unified model may accept digital files of different formats and/or for different audiences. Additionally, or alternatively, a single unified model may apply different sets of rules, depending on what the user device indicates.

Figure 1C:
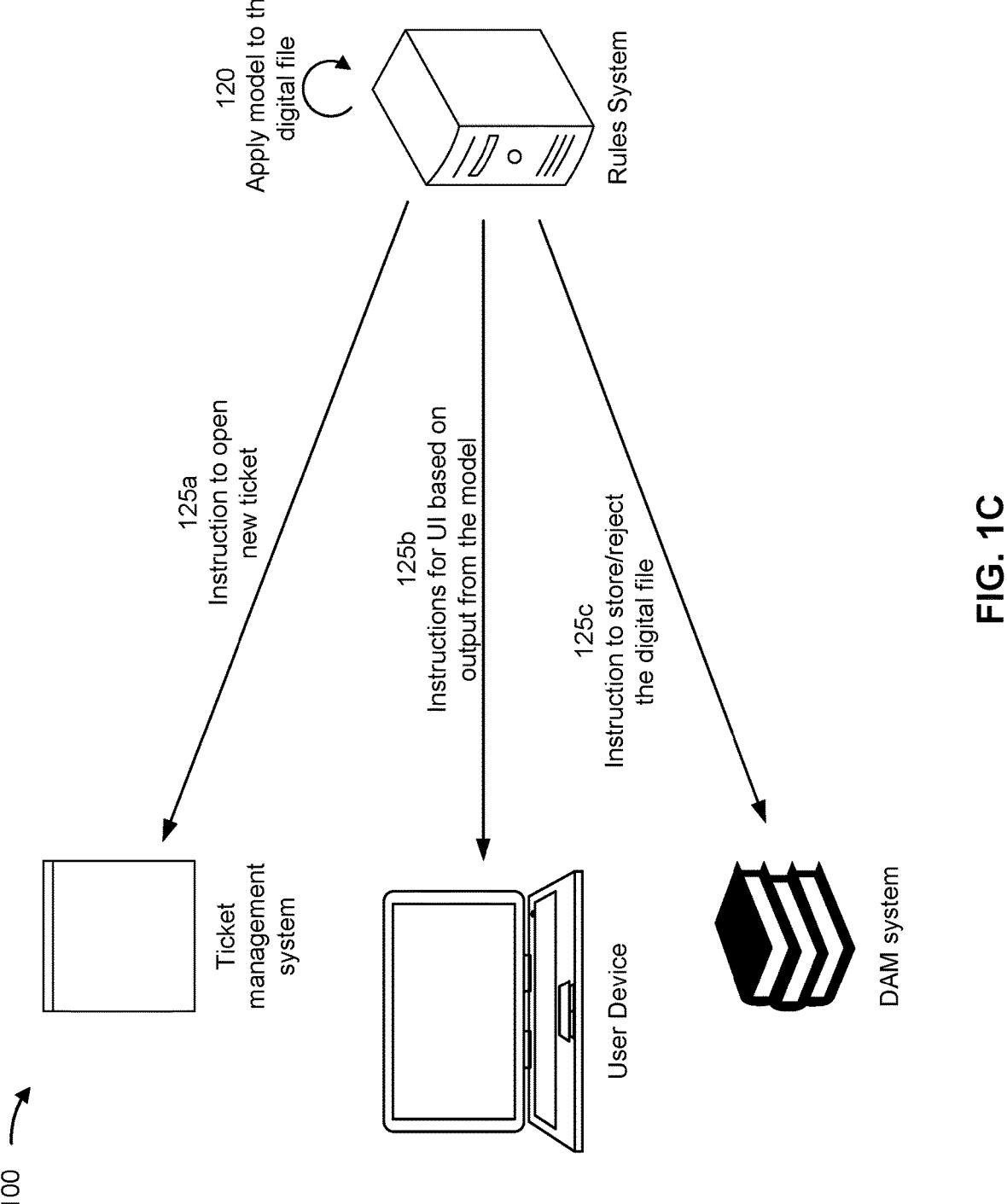

As shown in FIG. 1C and by reference number 120, the rules system may apply the model, to the digital file, to determine whether the digital file is compliant with the set of rules. For example, the rules system may input the digital file to the model (e.g., when the model includes a machine learning model) and/or may execute a routine that checks content of the digital file against the model (e.g., when the model includes a regex). The model may output a binary indicator (e.g., a Boolean or another type of bit indicating compliance with '1' or TRUE and non-compliance with '0' or FALSE) and/or a numerical indicator (e.g., a score representing a level of compliance between the digital files and one rule or multiple rules), among other examples. Using the model conserves power, processing resources, and network overhead that would otherwise have been consumed in verifying the digital files by using multiple communications between users.

In some implementations, the rules system may determine, based on output from the model, a compliance result (e.g., at least one compliance result). The compliance result may include different indicators associated with different rules. For example, one indicator may include a Boolean associated with a logo rule, and another indicator may include a score associated with a color rule. In another example, one indicator may include a Boolean associated with a font size rule, and another indicator may include a score associated with a spacing rule. The rules system may determine the indicators based on output from a single unified model (e.g., extracted from a matrix of results output by the model) or may determine the indicators by combining output from a bundle of models (e.g., associating different outputs with different portions of the set of rules).

In some implementations, the rules system may determine whether the digital file satisfies an inclusion threshold based on the compliance result. For example, the digital file may fail to satisfy the inclusion threshold based on the compliance result including too many (or too high a proportion of) negative binary indicators and/or including a score (e.g., one or more scores) that is too low. Similarly, the digital file may satisfy the inclusion threshold based on the compliance result including a sufficient quantity (or proportion) of positive binary indicators and/or including a score that is sufficiently high.

As shown by reference number 125a, the rules system may transmit, and the ticket management system may receive, an instruction to open a new ticket associated with the digital file. In some implementations, the rules system may transmit the instruction based on the inclusion threshold failing to be satisfied. The rules system may indicate a user, associated with the digital file, in the instruction. For example, the rules system may have validated a set of credentials associated with the user as a prerequisite to receiving the digital file.

The ticket management system may transmit, and the user device may receive, an indication of the ticket. The ticket management system may automatically transmit the indication based on opening the ticket. In some implementations, the ticket system may identify the user device. For example, a data structure may map identifiers of users (e.g., names, usernames, and/or email addresses, among other examples) to identifiers of devices (e.g., machine names, Internet protocol (IP) addresses, and/or medium access control (MAC) addresses, among other examples). Alternatively, the ticket system may identify an email address and/or a telephone number associated with the user, such that the indication of the ticket is included in an email message and/or a text message. The email address and/or the telephone number may be associated with the user device such that the email message and/or the text message is transmitted to the user device. The indication of the ticket increases chances that the user will view the ticket and correct the digital file, which conserves memory overhead that otherwise would have been wasted on a non-compliant digital file.

Additionally, or alternatively, as shown by reference number 125b, the rules system may transmit, and the user device may receive, instructions for a UI that indicates the compliance result. The UI may be as described in connection with FIG. 2A. For example, the compliance result may include a binary indicator, and the UI may include a visual representation of the binary indicator. Accordingly, the rules system may indicate which rules (in the set of rules) were passed by the digital file and which rules were failed by the digital file. Additionally, or alternatively, the compliance result may include a numeric indicator, and the UI may include a visual representation of the numeric indicator. The intuitive UI increases chances that the user will view the ticket and correct the digital file, which conserves memory overhead that otherwise would have been wasted on a non-compliant digital file.

Additionally, or alternatively, as shown by reference number 125c, the rules system may transmit, and the DAM system may receive, an instruction to store the digital file (e.g., based on the inclusion threshold being satisfied) or an instruction to reject the digital file (e.g., based on the inclusion threshold failing to be satisfied). The instruction to store the digital file may include a command to store the digital file along with the digital file itself. In some implementations, the DAM system may transmit, and the rules system may receive, in response to the instruction to store the digital file, an identifier that was assigned to the digital file by the DAM system. Therefore, the rules system may transmit, and the user device may receive, the identifier that was assigned to the digital file.

Integrating the DAM system with output from the model allows the DAM system to automatically reject digital files that are non-compliant with the rules. As a result, power, processing resources, and network overhead are conserved because digital files stored in the DAM system need not be re-validated against the set of rules in the future.

Figure 1D:
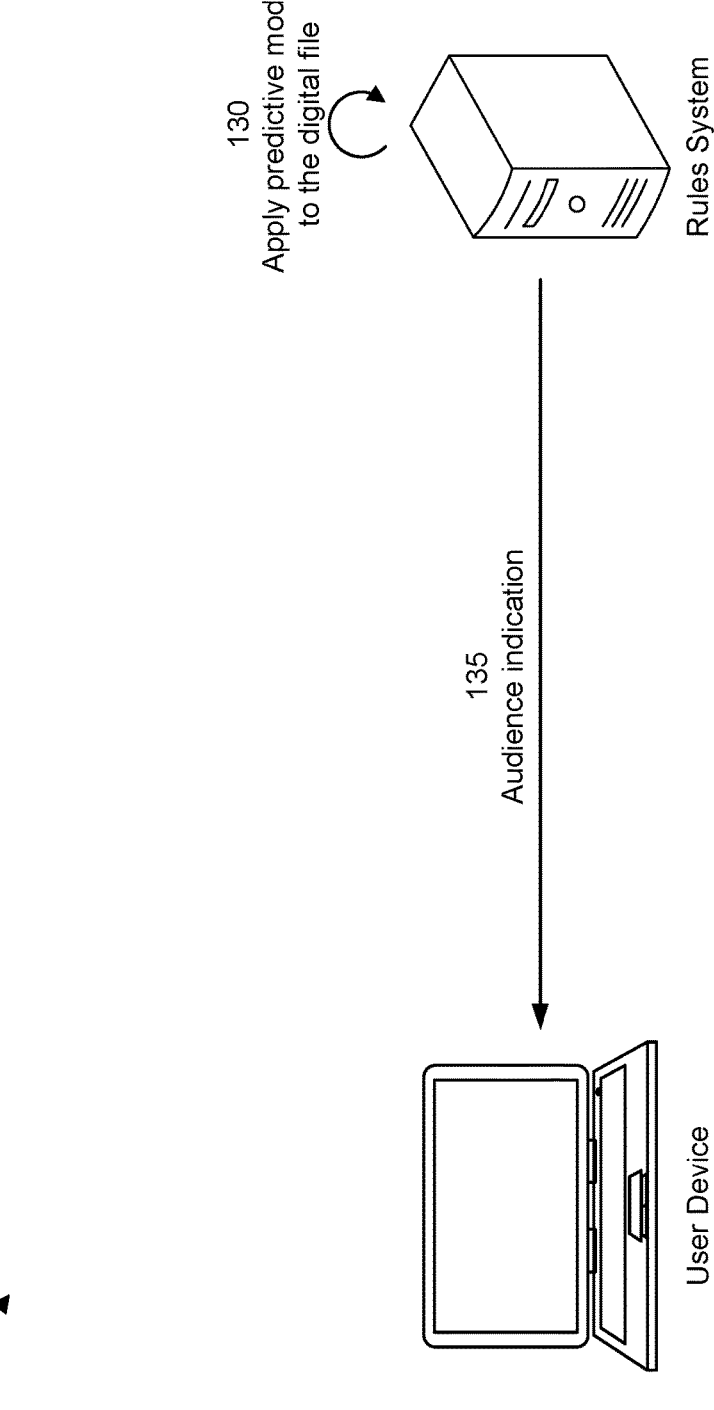

In some implementations, and as shown in FIG. 1D, the rules system may also provide analytics associated with the digital file. For example, as shown by reference number 130, the rules system may apply a predictive model to the digital file. The predictive model may output (or otherwise generate) an audience indication associated with the digital file. For example, the audience indication may indicate a target group for the digital file (e.g., young professionals, older retirees, or middle-aged parents, among other examples) and/or may indicate a performance metric (e.g., an expected conversion rate for the digital file). The predictive model may include a machine learning model (e.g., similar to the model, applied to the digital file based on the set of rules, as described above).

As shown by reference number 135, the rules system may transmit, and the user device may receive, the audience indication. The audience indication may be included in a same UI as the compliance result or in a different UI.

Additionally, or alternatively, the predictive model may output a practice indication (e.g., at least one practice indication) associated with the digital file. For example, the predictive model may accept, as input, the digital file and an indication of a channel associated with the digital file (e.g., an email distribution list, a direct mail geographic area, and/or a website, among other examples). The predictive model may determine and output the practice indication according to a set of rules associated with the indication of the channel. For example, the predictive model may suggest a time of day for sending based on a rule associated with email distribution channels. The predictive model may combine the practice indication with the audience indication, as described above. For example, the predictive model may estimate a change in audience and/or a change in effectiveness (e.g., a percentage value and/or another type of numeric indicator of increased reach and/or responsiveness). The predictive model may generate an audience indication for the digital file and an updated audience indication for an updated digital filed based on the practice indication. Thus, the predictive model may estimate the change by comparing the audience indication with the updated audience indication.

Additionally, or alternatively, the predictive model may output an indication of an enhancement (e.g., at least one enhancement) associated with the digital file. For example, the predictive model may accept, as input, the digital file (along with the audience indication and/or an indication of a channel associated with the digital file). The predictive model may determine and output the indication of the enhancement according to a set of rules associated with the audience and/or the channel. For example, the predictive model may suggest a shorter subject line based on an existing subject line in the digital file and a rule associated with email distribution channels. In another example, the predictive model may suggest a different font based on an existing font in the digital file and a rule associated with a geographic area for direct mail. In some implementations, the predictive model may output instructions for a UI that visually depict the enhancement. The UI may be as described in connection with FIG. 2B. The predictive model may combine the enhancement with the audience indication, as described above. For example, the predictive model may estimate a change in audience and/or a change in effectiveness (e.g., a percentage value and/or another type of numeric indicator of increased reach and/or responsiveness). The predictive model may generate an audience indication for the digital file and an updated audience indication for an updated digital filed based on the enhancement. Thus, the predictive model may estimate the change by comparing the audience indication with the updated audience indication.

In any examples described above, the user device may transmit, and the rules system may receive, an indication of whether a suggestion (e.g., a practice indication and/or an enhancement) was accepted or rejected. Additionally, the user device may transmit, and the rules system may receive, an indication of performance of the digital file (e.g., a quantity and/or type of audience reached and/or a conversion rate, among other examples). For example, the rules system may transmit (after a period of time has passed that satisfies a threshold), and the user device may receive, a prompt for performance, and the user device may transmit the indication of performance of the digital file in response to the prompt. Accordingly, the machine learning model may be re-trained or otherwise refined on the indication of performance (and based on whether the suggestion was accepted or rejected).

In some implementations, the rules system may further include a generative model. For example, the rules system may use a generative pre-trained transformer (GPT) to generate digital files from natural language prompts. The rules system may use a text-to-image model and/or a text-to-text model to generate digital files. The user device may transmit, and the rules system may receive, an audience indication and/or an indication of a channel along with a prompt. The rules system may therefore generate a digital file based on the prompt using a transformer (e.g., at least one transformer) trained for the audience and/or the channel that was indicated. The rules system may additionally verify the generated digital file against a set of rules, as described above in connection with a digital file from the user device.

The processes shown in FIGS. 1A-1D may be repeated. For example, the rules system may receive an additional digital file (e.g., from the same user device or a different user device) and may apply the model to determine whether the additional digital file is compliant with the set of rules. Accordingly, for the additional digital file and based on output from the model, the rules system may output instructions for an additional UI, an instruction to open an additional ticket, and/or an instruction to the DAM system.

By using techniques as described in connection with FIGS. 1A-1D, the rules system applies the model to automatically verify the digital file against the set of rules, which conserves power, processing resources, and network overhead that would otherwise have been consumed in verifying the digital file by using multiple communications between users. Additionally, the rules system may use output from the model to generate instructions for the UI and/or an instruction to open a ticket associated with the digital file. As a result, the user is more likely to correct the digital file. In some implementations, the rules system may cooperate with the DAM system to automatically reject the digital file when non-compliant with the set of rules, and thus additional power, processing resources, and network overhead are conserved because users can refrain from re-validating digital files, stored in the DAM system, against the set of rules.

As indicated above, FIGS. 1A-1D are provided as an example. Other examples may differ from what is described with regard to FIGS. 1A-1D.

Figure 2A:
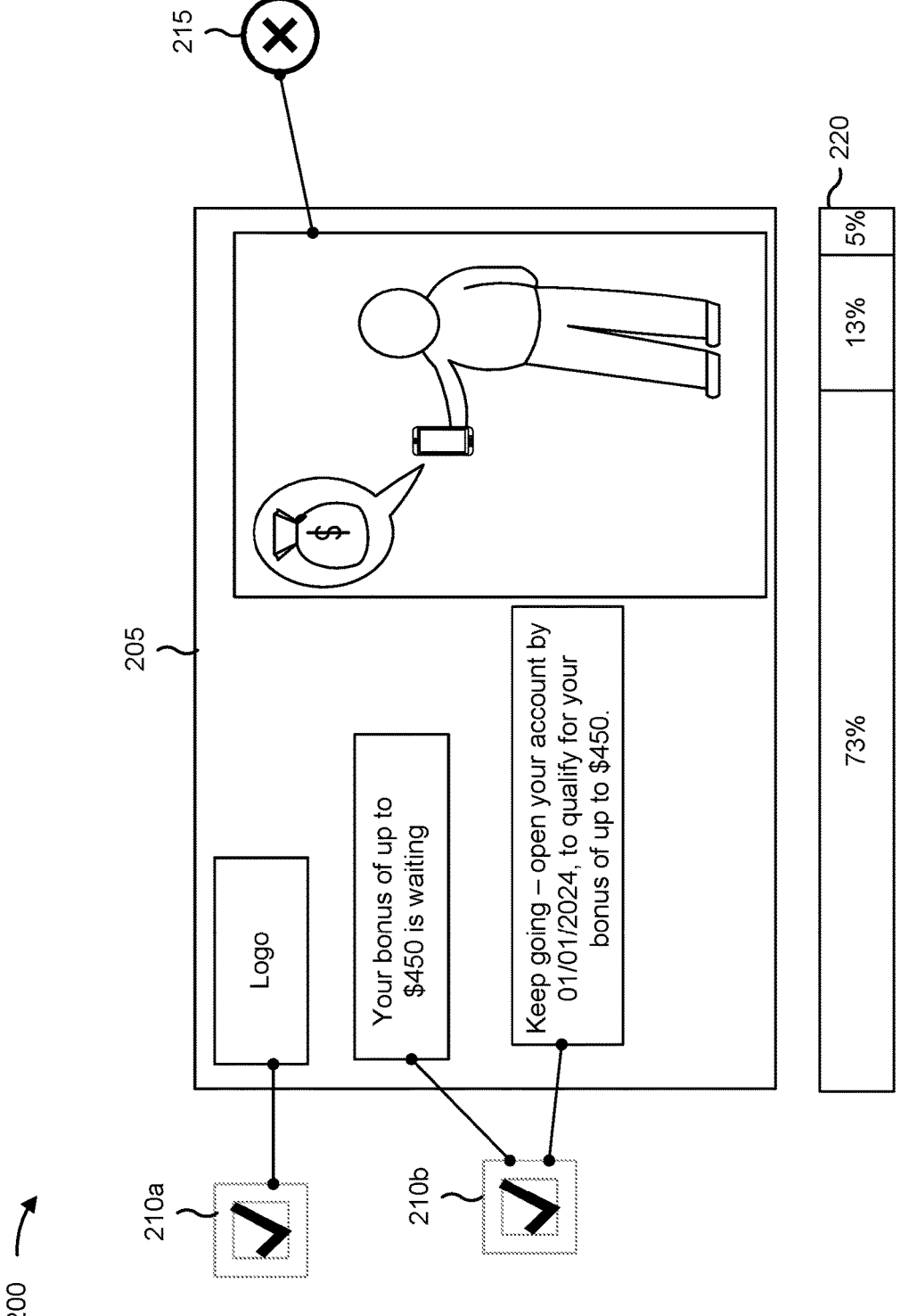
FIG. 2A is a diagram of an example user interface (UI) relating to verifying digital files against rules, in accordance with some embodiments of the present disclosure.

FIG. 2A is a diagram of an example UI 200 generated by systems and/or methods described herein. For example, the user device may output the example UI 200 based on instructions from the rules system. These devices are described in more detail in connection with FIGS. 4 and 5.

As shown in FIG. 2A, the example UI 200 may include a preview 205 of a digital file. The example UI 200 may further include a first visual representation 210a and a second visual representation 210b of a positive binary indicator. For example, the first visual representation 210a may be associated with the digital file complying with a logo rule, and the second visual representation 210b may be associated with the digital file complying with a tone rule. The example UI 200 may include a visual representation 215 of a negative binary indicator. For example, the visual representation 215 may be associated with the digital file failing to comply with an illustration (or photograph) rule. In addition, or as an alternative, to binary indicators, the example UI 200 may represent a numeric indicator. For example, as further shown in FIG. 2A, the example UI 200 may include a visual representation 220 of a numeric indicator associated with a color rule. In the example UI 200, the visual representation 220 depicts proportions of the digital file associated with different colors. In FIG. 2A, a first color comprises 73% of the digital file, a second color comprises 13% of the digital file, and a third color comprises 5% of the digital file. Therefore, a user may readily determine whether a proportion associated with a particular color is too high (or too low).

As indicated above, FIG. 2A is provided as an example. Other examples may differ from what is described with regard to FIG. 2A. For example, other UIs may include additional visual representations, fewer visual representations, and/or visual representations associated with different rules.

Figure 2B:
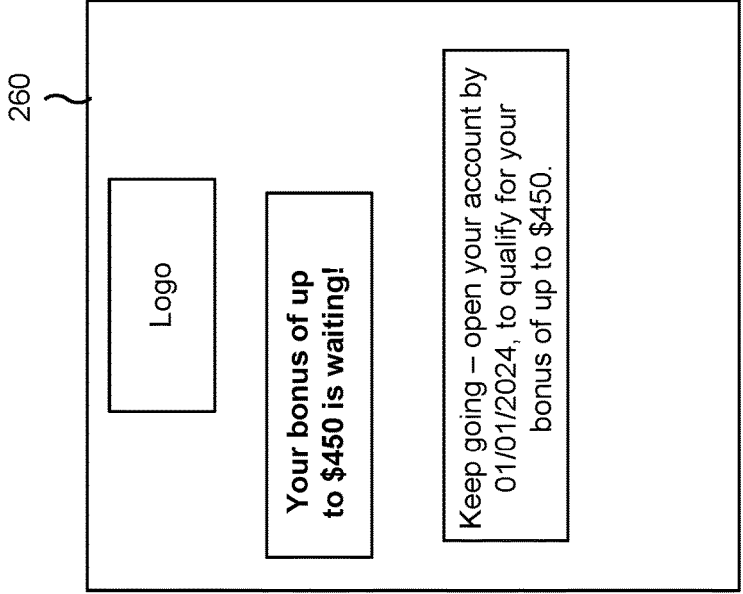
FIG. 2B is a diagram of an example UI relating to enhancing digital files, in accordance with some embodiments of the present disclosure.
Figure 2B:
Figure 2B:
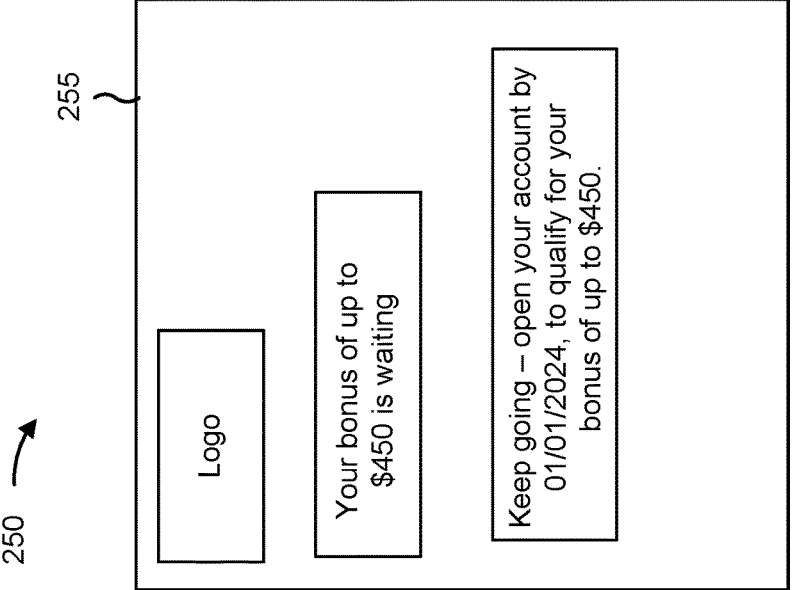

FIG. 2B is a diagram of an example UI 250 generated by systems and/or methods described herein. For example, the user device may output the example UI 250 based on instructions from the rules system. These devices are described in more detail in connection with FIGS. 4 and 5.

As shown in FIG. 2B, the example UI 200 may include a preview 255 of a digital file. Adjacent to the preview 255, the example UI 250 may include a preview 260 of an updated digital file with one or more suggested enhancements. In the example UI 250, the preview 260 includes a centered logo (e.g., visually representing a logo enhancement), a bolded sentence (e.g., visually representing a font enhancement), and an exclamation mark (e.g., visually representing a tone enhancement). The example UI 250 may further include elements that allow a user to accept or reject the suggested enhancement(s).

As indicated above, FIG. 2B is provided as an example. Other examples may differ from what is described with regard to FIG. 2B. For example, other UIs may include additional enhancements, fewer enhancements, and/or enhancements based on different rules.

Figure 3:
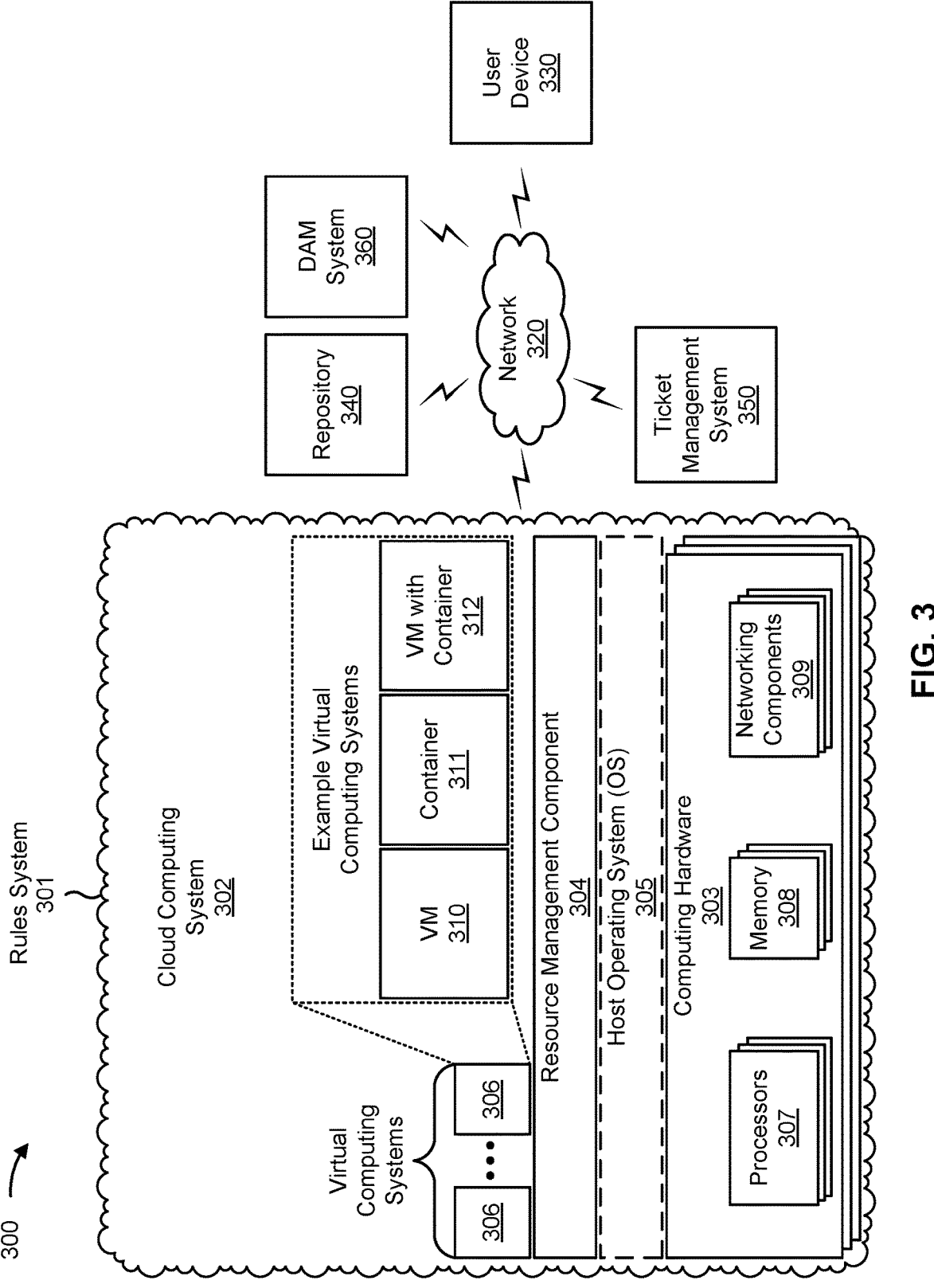
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a rules system 301, which may include one or more elements of and/or may execute within a cloud computing system 302. The cloud computing system 302 may include one or more elements 303-312, as described in more detail below. As further shown in FIG. 3, environment 300 may include a network 320, a user device 330, a repository 340, a ticket management system 350, and/or a DAM system 360. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the rules system 301 may include one or more elements 303-312 of the cloud computing system 302, may execute within the cloud computing system 302, and/or may be hosted within the cloud computing system 302, in some implementations, the rules system 301 may not be cloud-based (e.g., may be implemented outside of a cloud computing system) or may be partially cloud-based. For example, the rules system 301 may include one or more devices that are not part of the cloud computing system 302, such as device 400 of FIG. 4, which may include a stand-alone server or another type of computing device. The rules system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information associated with digital files, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 330 may communicate with one or more other devices of environment 300, as described elsewhere herein.

The repository 340 may include one or more devices capable of receiving, generating, storing, processing, and/or providing information associated with digital files, as described elsewhere herein. The repository 340 may include a communication device and/or a computing device. For example, the repository 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The repository 340 may communicate with one or more other devices of environment 300, as described elsewhere herein.

The ticket management system 350 may include one or more devices capable of receiving, generating, storing, processing, and/or providing information associated with tickets, as described elsewhere herein. The ticket management system 350 may include a communication device and/or a computing device. For example, the ticket management system 350 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The ticket management system 350 may include an issue tracking system, such as Jira or Bugzilla®, among other examples. The ticket management system 350 may communicate with one or more other devices of environment 300, as described elsewhere herein.

The DAM system 360 may include one or more devices capable of receiving, generating, storing, processing, and/or providing information associated with digital files, as described elsewhere herein. The DAM system 360 may include a communication device and/or a computing device. For example, the DAM system 360 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The DAM system 360 may include Brandfolder®, Adobe® Experience Manager, Paperflite, or Canto® software, among other examples. The DAM system 360 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
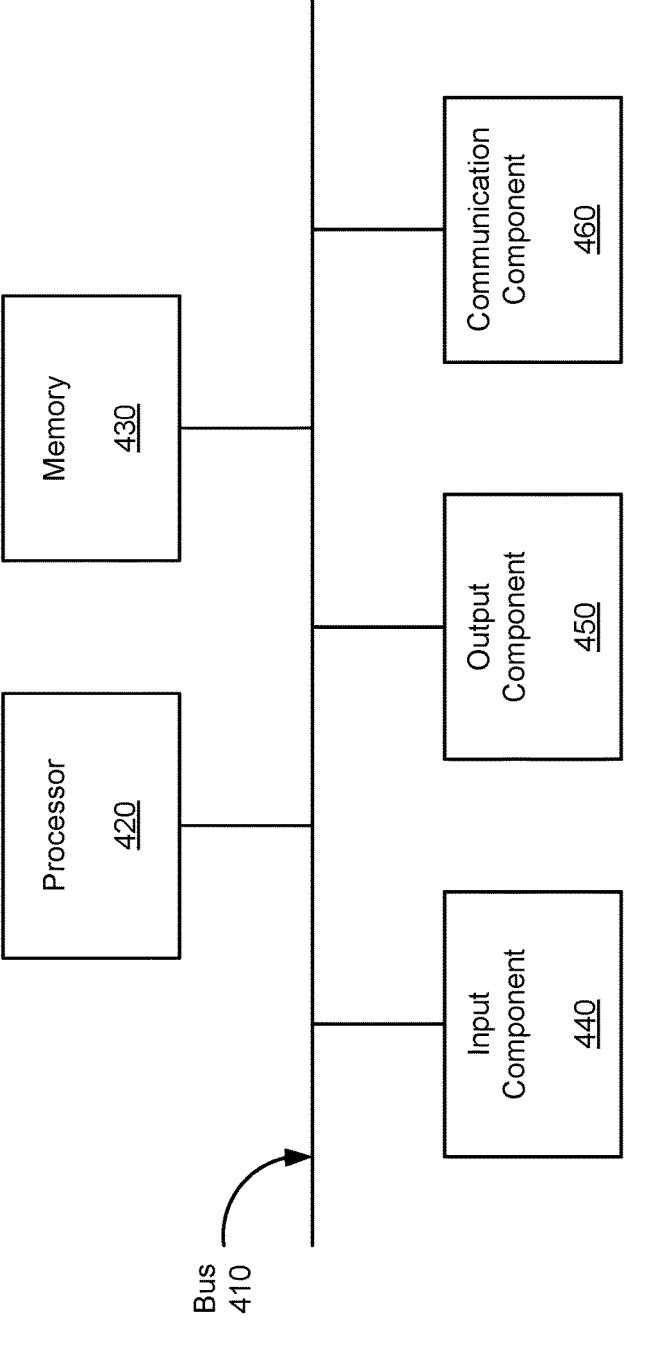
FIG. 4 is a diagram of example components of one or more devices of FIG. 3, in accordance with some embodiments of the present disclosure.

FIG. 4 is a diagram of example components of a device 400 associated with verifying digital files against rules. The device 400 may correspond to a user device 330, a repository 340, a ticket management system 350, and/or a DAM system 360. In some implementations, a user device 330, a repository 340, a ticket management system 350, and/or a DAM system 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with verifying digital files against rules. In some implementations, one or more process blocks of FIG. 5 may be performed by the rules system 301. In some implementations, one or more process blocks of FIG. 5 may be performed by another device or a group of devices separate from or including the rules system 301, such as a user device 330, a repository 340, a ticket management system 350, and/or a DAM system 360. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving a digital file associated with an entity (block 510). For example, the rules system 301 (e.g., using processor 420, memory 430, input component 440, and/or communication component 460) may receive a digital file associated with an entity, as described above in connection with reference number 105a and/or reference number 105b of FIG. 1A. As an example, the rules system 301 may receive the digital file from a user device and/or a repository. In a combinatory example, the rules system 301 may receive an indication of a location, associated with the digital file, from the user device; may transmit a request for the digital file, to the repository, based on the location; and may receive the digital file from the repository in response to the request.

As further shown in FIG. 5, process 500 may include receiving, from a user device, an indication of a set of rules associated with the entity (block 520). For example, the rules system 301 (e.g., using processor 420, memory 430, input component 440, and/or communication component 460) may receive, from a user device, an indication of a set of rules associated with the entity, as described above in connection with reference number 110 of FIG. 1B. As an example, a user may interact with the UI elements to trigger the user device to transmit the indication of the set of rules. For example, the user may check a checkbox or select a radio button to indicate a rule to include within the set of rules.

As further shown in FIG. 5, process 500 may include applying, associated with the set of rules, a model to determine whether the digital file is compliant with the set of rules (block 530). For example, the rules system 301 (e.g., using processor 420 and/or memory 430) may apply, associated with the set of rules, a model to determine whether the digital file is compliant with the set of rules, as described above in connection with reference number 120 of FIG. 1C. As an example, the rules system 301 may input the digital file to the model (e.g., when the model includes a machine learning model) and/or may execute a routine that checks content of the digital file against the model (e.g., when the model includes a regex).

As further shown in FIG. 5, process 500 may include determining at least one compliance result based on output from the model (block 540). For example, the rules system 301 (e.g., using processor 420 and/or memory 430) may determine at least one compliance result based on output from the model, as described above in connection with reference number 120 of FIG. 1C. As an example, the at least one compliance result may include different indicators associated with different rules; one indicator may include a Boolean associated with a logo rule, and another indicator may include a score associated with a color rule, among other examples.

As further shown in FIG. 5, process 500 may include transmitting, to the user device, instructions for a UI that indicates the at least one compliance result (block 550). For example, the rules system 301 (e.g., using processor 420, memory 430, and/or communication component 460) may transmit, to the user device, instructions for a UI that indicates the at least one compliance result, as described above in connection with reference number 125b of FIG. 1C. As an example, the UI may be as described in connection with FIG. 2A.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1D and/or FIGS. 2A-2B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying digital files, the system comprising:
one or more memories; and
one or more processors, communicatively coupled to the one or more memories, configured to:
receive a digital file associated with an entity;
receive, from a user device, an indication of a set of rules, associated with the entity, out of a plurality of possible sets of rules;
receive, from the user device and based on interaction with a user interface (UI) element, an indication of an audience associated with the digital file, wherein the audience indicates a demographic group;
select, based on the indication of the audience associated with the digital file, a machine learning model associated with the set of rules;
apply the machine learning model to determine whether the digital file is compliant with the set of rules;
determine that the digital file satisfies an inclusion threshold based on output from the machine learning model; and
instruct a digital asset management (DAM) system to store the digital file based on the inclusion threshold being satisfied.

2. The system of claim 1, wherein the one or more processors are configured to:
receive an additional digital file;
apply the machine learning model to determine whether the additional digital file is compliant with the set of rules;
determine that the additional digital file fails to satisfy the inclusion threshold based on additional output from the machine learning model; and
instruct the DAM to reject the additional digital file based on the inclusion threshold failing to be satisfied.

3. The system of claim 2, wherein the one or more processors are configured to:

instruct a ticket management system to open a new ticket associated with the additional digital file based on the inclusion threshold failing to be satisfied.

4. The system of claim 1, wherein the one or more processors are configured to:
transmit instructions for UI elements, including the UI element, to the user device,
wherein the indication of the set of rules is received based on interaction with the UI elements.

5. The system of claim 1, wherein the one or more processors, to receive the digital file, are configured to:
receive the digital file from the user device.

6. The system of claim 1, wherein the one or more processors, to receive the digital file, are configured to:
transmit a request for the digital file to a repository; and
receive the digital file from the repository in response to the request.

7. A method of verifying digital files, comprising:
receiving, at a rules system, a digital file associated with an entity;
receiving, from a user device, an indication of a set of rules associated with the entity;
applying a model, by the rules system and associated with the set of rules, to determine whether the digital file is compliant with the set of rules, wherein the model is selected based on an audience associated with the digital file, and wherein the audience indicates a demographic group;
determining, by the rules system, at least one compliance result based on output from the model; and
transmitting, to the user device, instructions for a user interface (UI) that indicates the at least one compliance result.

8. The method of claim 7, wherein the at least one compliance result includes a binary indicator, and the UI includes a visual representation of the binary indicator.

9. The method of claim 7, wherein the at least one compliance result includes a numeric indicator, and the UI includes a visual representation of the numeric indicator.

10. The method of claim 7, wherein the model includes at least one regular expression.

11. The method of claim 7, wherein the model includes at least one machine learning model.

12. The method of claim 7, further comprising:
applying, by the rules system, a predictive model to the digital file to generate an audience indication associated with the digital file; and
transmitting, to the user device, the audience indication.

13. The method of claim 7, further comprising:
instructing a ticket management system to open a new ticket associated with the digital file based on the at least one compliance result.

14. A non-transitory computer-readable medium storing a set of instructions for verifying digital files, the set of instructions comprising:
one or more instructions that, when executed by one or more processors of a device, cause the device to:
receive a digital file associated with an entity;
apply a machine learning model to determine whether the digital file is compliant with a set of rules associated with the entity, wherein the machine learning model is selected based on an audience associated with the digital file, and wherein the audience indicates a demographic group;
determine that the digital file satisfies an inclusion threshold based on output from the machine learning model; and instruct a digital asset management (DAM) system to store the digital file based on the inclusion threshold being satisfied.

15. The non-transitory computer-readable medium of claim 14, wherein the one or more instructions, when executed by the one or more processors, cause the device to:
select the machine learning model based on a format associated with the digital file.

16. The non-transitory computer-readable medium of claim 14, wherein the one or more instructions, when executed by the one or more processors, cause the device to:
receive an indication of the audience based on interaction with a user interface (UI) element.

17. The non-transitory computer-readable medium of claim 14, wherein the one or more instructions, when executed by the one or more processors, cause the device to:
receive authorization from a single sign on (SSO) service associated with the device,
wherein the digital file is received based on the authorization.

18. The non-transitory computer-readable medium of claim 14, wherein the set of rules includes at least one of:
a tone rule;
a color rule;
a logo rule; or
a font rule.

19. The non-transitory computer-readable medium of claim 14, wherein the one or more instructions, when executed by the one or more processors, cause the device to:
apply a predictive model to the digital file to generate an audience indication associated with the digital file; and
output the audience indication.

20. The non-transitory computer-readable medium of claim 14, wherein the one or more instructions, that cause the device to instruct the DAM system, cause the device to:
transmit, to the DAM system, a command to store the digital file; and
receive, from the DAM system, an identifier that was assigned to the digital file by the DAM system.

\* \* \* \* \*